United States Patent [19]

Wallace

[11] Patent Number: 5,403,056

[45] Date of Patent: Apr. 4, 1995

[54] ROBOTIC HAND FOR TRANSFERRING ARTICLES

[75] Inventor: Gary L. Wallace, Jeffersontown, Ky.

[73] Assignee: Planet Products Corporation, Cincinnati, Ohio

[21] Appl. No.: 83,586

[22] Filed: Jun. 30, 1993

[51] Int. Cl.$^6$ ............................................. B65G 57/30
[52] U.S. Cl. .................... 294/98.1; 53/475; 53/532; 414/795.2; 901/39
[58] Field of Search ............................ 294/63.2, 98.1; 414/794.9, 786.1, 795.2; 901/7, 39; 53/475, 532, 540

[56] References Cited

U.S. PATENT DOCUMENTS 3,347,587 10/1967 Frost ............................ 294/98.1 X
4,071,149 1/1978 Deguchi ...................... 414/795.2 X

FOREIGN PATENT DOCUMENTS 1-299123 12/1989 Japan ................................ 901/7

*Primary Examiner*—Michael S. Huppert
*Assistant Examiner*—Janice L. Krizek
*Attorney, Agent, or Firm*—Kinney & Schenk

[57] ABSTRACT

A robotic hand on a robot is capable of picking-up several generally flattened articles in a stack form in a gentle non-damaging manner. The robotic hand has a manifold for directing controlled pressure air and a set of gripper finger assemblies extending therefrom. Each finger assembly has a rigid finger support member and an inflatable bladder extending along its length. The bladders are in communication with the chamber of the manifold and an external source of positive and negative pressure air. The robotic hand is capable of positioning itself over an article to be picked-up with the set of gripper finger assemblies encompassing the article. Pressurized air is directed through the manifold and into the bladders of the finger assemblies. The bladders expand sufficiently to grasp sides of the article. The robotic hand is moved to a position over another article wherein the bladders of the finger assemblies are deflated by drawing a vacuum through the manifold to cause the first article to drop onto the second article. Reinflating the bladders causes the gripper finger assemblies to grasp the two articles. The sequence of steps is repeated until a stack of a pre-determined number of articles is formed within the finger assemblies. The robotic hand deposits the stack into an open-top container to ultimately fill the container.

17 Claims, 6 Drawing Sheets

ROBOTIC HAND FOR TRANSFERRING ARTICLES

This invention relates to a robotic hand for use on a robot. More particularly, the invention relates to a robotic hand used on a robot for picking-up generally round flattened articles in a stack form and depositing the stack into an open-top container to ultimately fill the container.

BACKGROUND OF THE INVENTION

Many industrial processes produce small articles in bulk which must be packaged and transported to the retailer or individual consumer. The food industry in particular processes many meat and vegetable products which must be frozen and/or hermetically sealed in a package prior to leaving the plant. Many packaging machines are known for this purpose which operate in a very efficient manner.

Processed food articles, and in particular meat products such as burger patties and sausage patties, for eventual sale to restaurants and institutions present special problems in the processing plant. The food articles are made in bulk by very efficient automated equipment. They must also be efficiently packaged in a sanitary manner for the whole process to be efficient. The articles presently are conveyed to a packaging station and loaded into cartons. Flattened articles such as the burger and sausage patties have been stacked in open-top cartons and shipped. Hand-loading is very inefficient and can cause sanitation problems. Industrial robots are a much better way to package the food articles and have been used to a limited extent for this purpose.

Robots are available which are able to pick-up individual articles from a conveyor or a product accumulation station and transfer them into a packaging container. It has been found that known systems using robots in packaging processed food articles have not been fully satisfactory. Most of the food articles are fragile in that they bruise easily or crumble easily. Even many frozen articles are sufficiently friable that small bits of food are easily knocked loose. Besides the wastage this creates, a sanitation problem is created. The food bits must be continually removed from the packaging station. This often entails shutting down the whole packaging assembly line for a thorough wash-down. The robotic systems simply have not been fully satisfactory for packaging certain processed food articles because their mechanical components are too damaging in one way or another to the articles.

There is a need for an improved method of transferring processed food articles into packaging containers for shipment to the customer. In accord with this need, there has been developed a robotic hand for use on a robot which is able to pick-up generally round flattened articles in a gentle, non-damaging manner. The robotic hand is economical to build and very efficient in its operation.

SUMMARY OF THE INVENTION

A robotic hand for use on a robot programmed to pick-up a plurality of generally flattened articles in a stack form is able to perform its function and deposit the articles into a container without damaging the articles. The robotic hand comprises a manifold for attachment to the robot and a set of gripper finger assemblies extending from the manifold. The finger assemblies are arranged to receive the articles therewithin in a stack. Each finger assembly has a rigid finger support member and an inflatable bladder which extends along the length of the finger support member and is secured thereto. Communication means are provided to direct controlled pressure air from the manifold into the bladders. The bladders in the finger assemblies are capable of inflating to grasp an article at its sides and then deflating to drop the article onto another article. The bladders are again inflated to now grasp two articles. The process is repeated until a predetermined number of articles form a stack within the finger assemblies. The robot transfers the stack of articles to a container where it is deposited. The container is ultimately loaded with several stacks of articles and readied for shipment.

DETAILED DESCRIPTION OF THE INVENTION

The invention is described in detail in the following paragraphs and with particular reference to the drawings. The robotic hand of the invention is especially useful for the lifting of burger patties from a packaging station and depositing them into a container for shipment. The robotic hand is also useful for picking-up and transferring other generally flattened food articles such as sausage patties, chicken patties and hash brown patties. It can be used with other non-food articles of the same general shape and size, though its use for transferring the above food articles is particularly preferred and, for this reason, the following description of the invention is with reference to burger patties.

Figure 1:
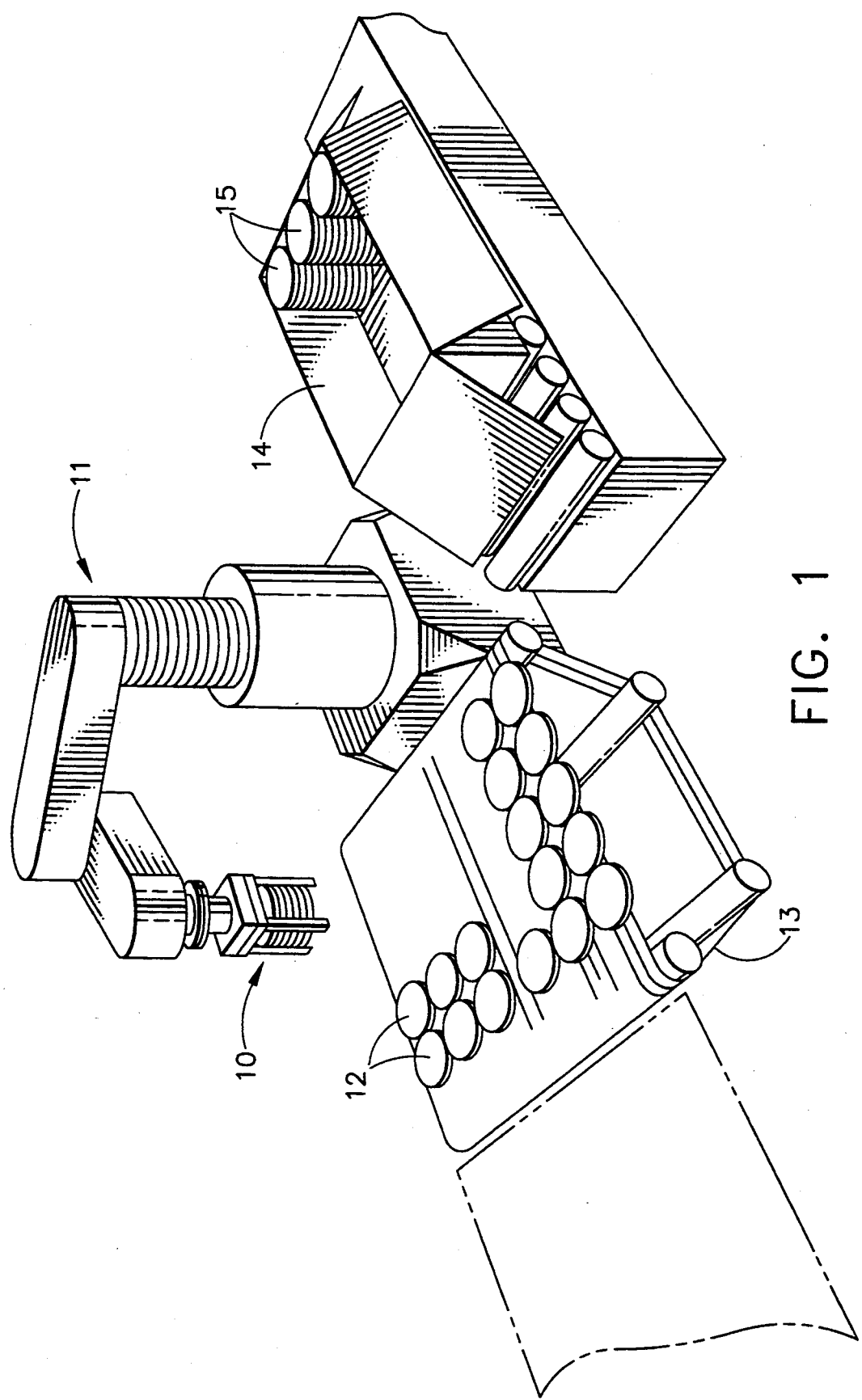
FIG. 1 is an environmental view showing a robot with the robotic hand of the invention in the process of lifting food patties from a product elevator and depositing them into a carton.
Figure 2:
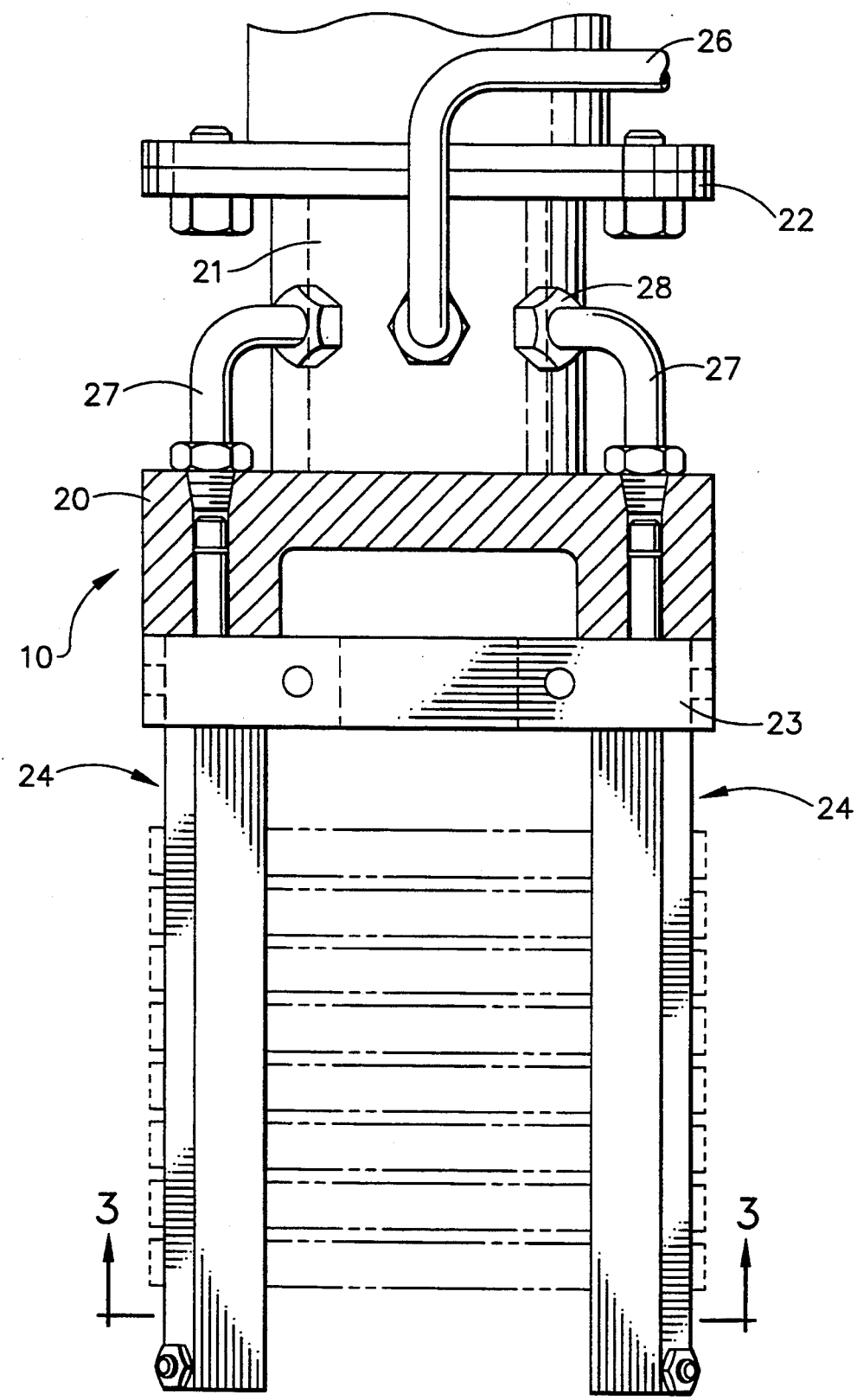
FIG. 2 is a plan view partially in section of the robotic hand of FIG. 1.

The robotic hand 10 of the invention is shown in FIG. 1 on a robot 11. The robot 11 is in the act of transferring frozen generally round burger patties 12 lifted from a product elevator 13 and depositing them into a carton 14 in the form of stacks 15 containing twelve burger patties each. This represents two cycles of the robot in that the robotic hand described with reference to FIG. 1 is programmed to pick-up six burger patties at a time. The carton is eventually loaded by the robot. A conveyor (shown in phantom) delivers the patties to the product elevator 13. The product elevator 13 is well known in the industry. It is used to eliminate conveyor pressure and to center the burger patties during picks by the robotic hand. A series of narrow bands of the product elevator form a flat open surface on which the burger patties are suspended.

The robot 11 is programmed to pick-up the burger patties from specific spots on the stationary product elevator 13. As is evident, the burger patties are aligned in straight rows and straight columns in a uniform side-by-side touching arrangement. Movements of the robotic arms and the product elevator are timed to ensure each burger patty is lifted and transferred into the carton. Industrial robots for doing the general type of movements described herein are commercially available. They are also readily programmed to perform the sequence of steps necessary with the robotic hand described in detail below.

With reference to FIGS. 2–6, the robotic hand 10 of the invention has a manifold 20 with the manifold chamber 21 shown in phantom, a mounting flange 22 extending from the manifold 20, finger mount flanges 23 extending from the manifold 20 and a set of four gripper finger assemblies 24. The finger assemblies 24 extend from the manifold 20 in an array to pick-up and stack a pre-set number of burger patties. In effect, the manifold is used to distribute controlled pressure air to bladders in the finger assemblies to inflate them sufficiently to grasp the burger patties and also to deflate the bladders to cause them to drop the burger patties upon command.

The manifold 20 has an interior chamber 21 to receive the controlled pressure air through a supply line 26 from a source not shown. The same supply line is used to withdraw air from the manifold chamber as more fully described below. The manifold chamber 21 is in communication with bladders in the finger assemblies 24 through separate distributor lines 27 and holes through the body of the manifold 20. The manifold's purpose is to ensure that air under uniform positive or negative pressure is directed to the bladders of the four finger assemblies. Fittings 28 of a conventional nature are used to secure the supply line 26 and the distributor lines 27 to the manifold 20. The mounting flange 22 at the top of the manifold 20 has bolt holes which are in alignment with holes in a mount plate found on the arm of the robot. A set of bolts and nuts is used to removably secure the manifold to the robot arm in a manner whereby the robotic hand can be periodically removed for cleaning and repair purposes.

Each of the finger mount flanges 23 extends from the bottom of the manifold 20 to form an open interior square on the manifold's bottom surface. The finger mount flanges 23 are used to securely hold ends of the gripper finger assemblies 24. The flanges can be individually attached to the manifold or can be formed as a single piece in a square shape and attached. The flange sides are equal in length and are dimensioned according to the burger patty size.

Figure 3:
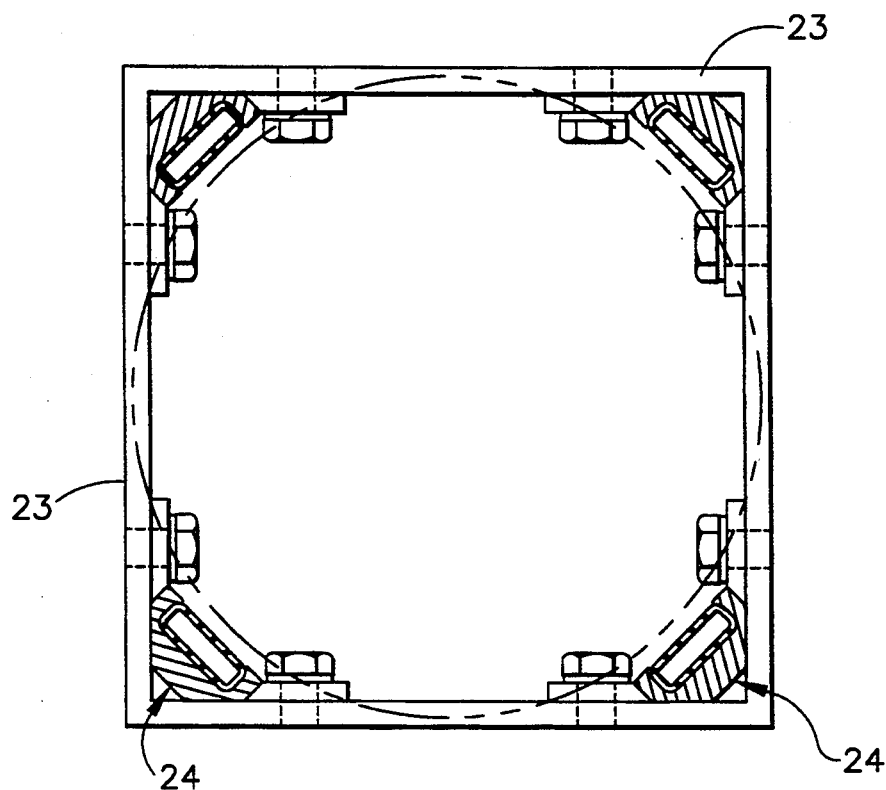
FIG. 3 is a bottom view partially in section of the robotic hand taken along line 3—3 of FIG. 2.
Figure 4:
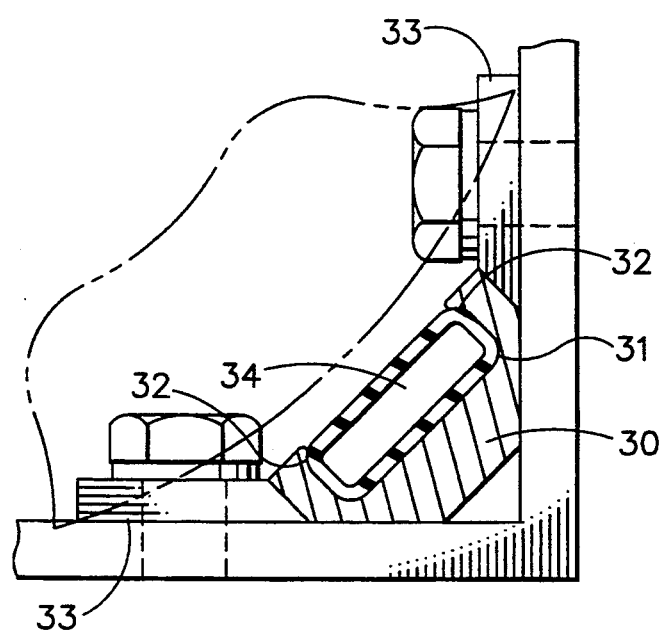
FIG. 4 is a partial bottom view of the robotic hand of FIG. 3 showing a gripper finger assembly in detail.
Figure 5:
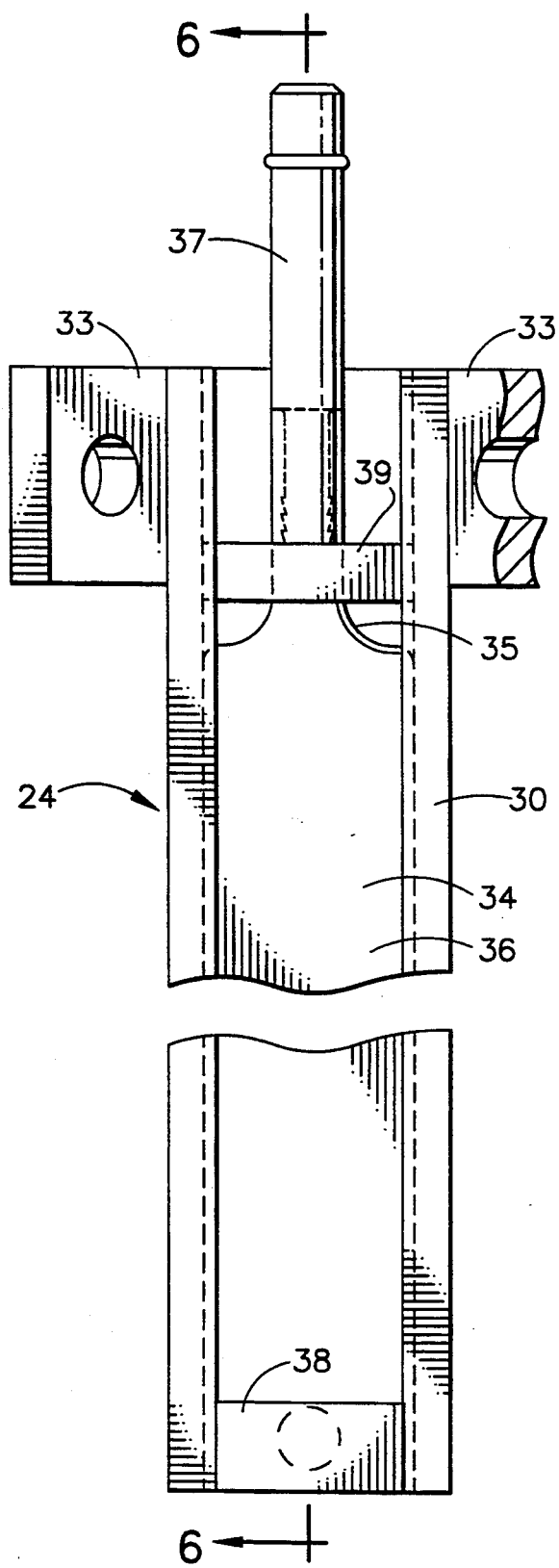
FIG. 5 is a plan view of one of the gripper finger assemblies of the robotic hand of FIG. 2 showing securement of a bladder on a finger support member.
Figure 6:
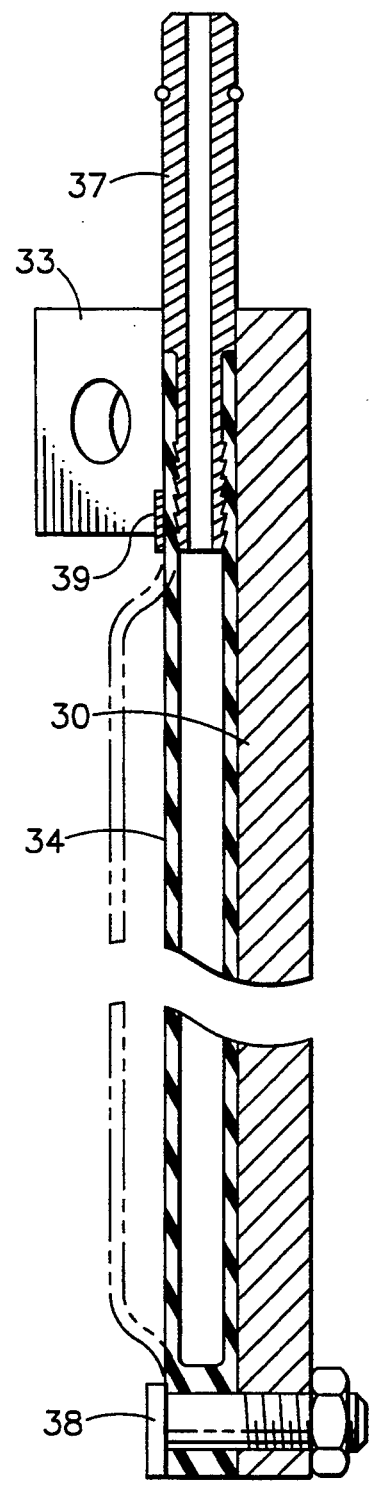
FIG. 6 is a side view in section of the gripper finger assembly of FIG. 5 taken along line 6—6 thereof.

With reference to FIGS. 3–6, each of the four gripper finger assemblies 24 has an elongated rigid finger support member 30 which is securely mounted to the finger mount flanges 23. The gripper finger assemblies 24 of the robotic hand 10 are to grasp the generally round burger patties. Accordingly, the finger support members are oriented to face a side of the burger patty in a manner whereby maximum side contact of the patty is made. As best seen in FIGS. 3 and 4, each finger support member is generally rectangular in shape with beveled corners to fit diagonally into a corner formed by two finger mount flanges. As such, one flat face presents itself to the burger patty. Each of the finger support members has a channel 31 extending along its inside face substantially the full length. The channel has an inwardly directed ridge 32 extending along each vertical edge of the channel to help retain the bladder in place.

Each finger support member 30 is secured to the finger mount flanges 23 by two finger mount fittings 33. The fitting 33 has one beveled edge to mate with the finger support member beveled side and is bolted to the finger mount flange 23. One finger mount fitting 33 on each side of the finger support member rigidly holds it in place.

An elongated inflatable bladder 34 is dimensioned to fit in the channel 31 of each of the finger support members 30 for the purpose further discussed below. The bladder 34 in its natural state essentially fills the channel 31 as evident in FIGS. 3, 4 and 6. It has a generally rectangular shape similar in size to the channel 31 of the finger support member 30. The elongated bladder 34 has a tapered neck 35 which extends from its main body 36. The neck 35 begins near the finger mount flange 23 and is equipped with a rigid connection tube 37 for delivering and removing the controlled pressure air. The material used to construct the bladder must be capable of repeated flexings due to multiple inflations and deflations and also must be made of a material suitable for incidental food contact.

The bladder 34 is secured to the finger support member 30 by the channel ridges 32 as well as by a retaining clamp 38 near its bottom and by a retaining clip 39 across its neck. The retaining clamp 38 is dimensioned to fit into the finger support member channel 31 and be bolted to the finger support member to trap the bladder in a stationary manner. The retaining clip 39 is a flat semi-rigid plate which has a length sufficient to snap into the channel 31 underneath the channel ridges 32 to in effect trap the bladder neck 35 in place.

Collectively, the four gripper finger assemblies 24 form an open-bottom box-like shaped area. A diagonal across a plane of the box-like area is slightly larger than the diameter of the burger patties to be picked-up. The length of the box-like area is dependent on the number of burger patties to be picked-up. The robotic hand of the invention typically picks up from four to twelve burger patties and the gripper finger assemblies have a length accordingly.

The bladders of the gripper finger assemblies of the robotic hand 10 are in communication with pressurized air to inflate and deflate the bladders as programmed. The air supply line 26 leads to a four-way valve (not shown). The valve is used to initially emit pressurized air to the manifold chamber and then to the bladders to cause them to expand. The finger assemblies with their bladders in the expanded state have the right size to grasp sides of a burger patty. The air valve is also used to draw a vacuum in the bladders to cause them to deflate and effectively drop the burger patty.

In operation, the robotic hand receives its commands from a program to move laterally and vertically according to the program and to grasp and ungrasp generally round flattened articles encompassed by its four fingers. Thus, initially, the articles are conveyed to the robot and are held on the product elevator. The articles are suspended on the bands of the product elevator in an aligned manner. Upon command, the robotic hand with the bladders of the gripper finger assemblies in a deflated state drops down sufficiently far that at least the tips of the gripper finger assemblies encompass an article. Pressurized air is caused to flow to the bladders to inflate them and cause them to grasp sides of the article in a gentle but secure manner. The robotic hand raises upon command and travels to another article on the conveyor. Once properly positioned, it lowers and a negative pressure in the bladders is induced to cause the robotic hand to drop the first article directly onto the second article. The four finger assemblies are caused to extend down far enough to now encompass two articles stacked one on the other. The bladder-lined fingers are again caused to inflate and grasp the two trapped articles. The process repeats itself until the desired number of articles are stacked within the gripper finger assemblies of the robotic hand. The hand is then caused to swing to a side and steady itself over an open-top container. The bladders of the finger assemblies are again deflated to drop the articles into the container and still in a stack form. The robotic hand continues to pick-up other articles on the product elevator in the same manner and to deliver them to the open-top container until it is filled.

The robotic hand of the invention is able to gently pick up the articles in a non-damaging manner. That is, the softness and pliability of the bladders on the gripper finger assemblies do not break off bits of the articles, e.g. the burger patties during their several inflating and deflating steps. In practice it has also been found the nature of the bladders is such that articles which vary in size from the norm are still grasped and transferred. This tolerance for size variations represents a distinct advantage in efficiency of loading with a minimum of product wastage and product shortage in the containers. Another distinctive advantage of the robotic hand is that it is self-correcting. Any article which is picked up or assumes a non-planar position within the finger assemblies of the hand rights itself either when another article is grasped or when the stack of articles within the finger assemblies are transferred into the container. A neatly stacked array of articles is consistently formed in the container. Ultimately, the articles are very efficiently transferred from the product elevator into the container without consequent product damage, miscount, misalignment or sanitation problems.

Figure 7:
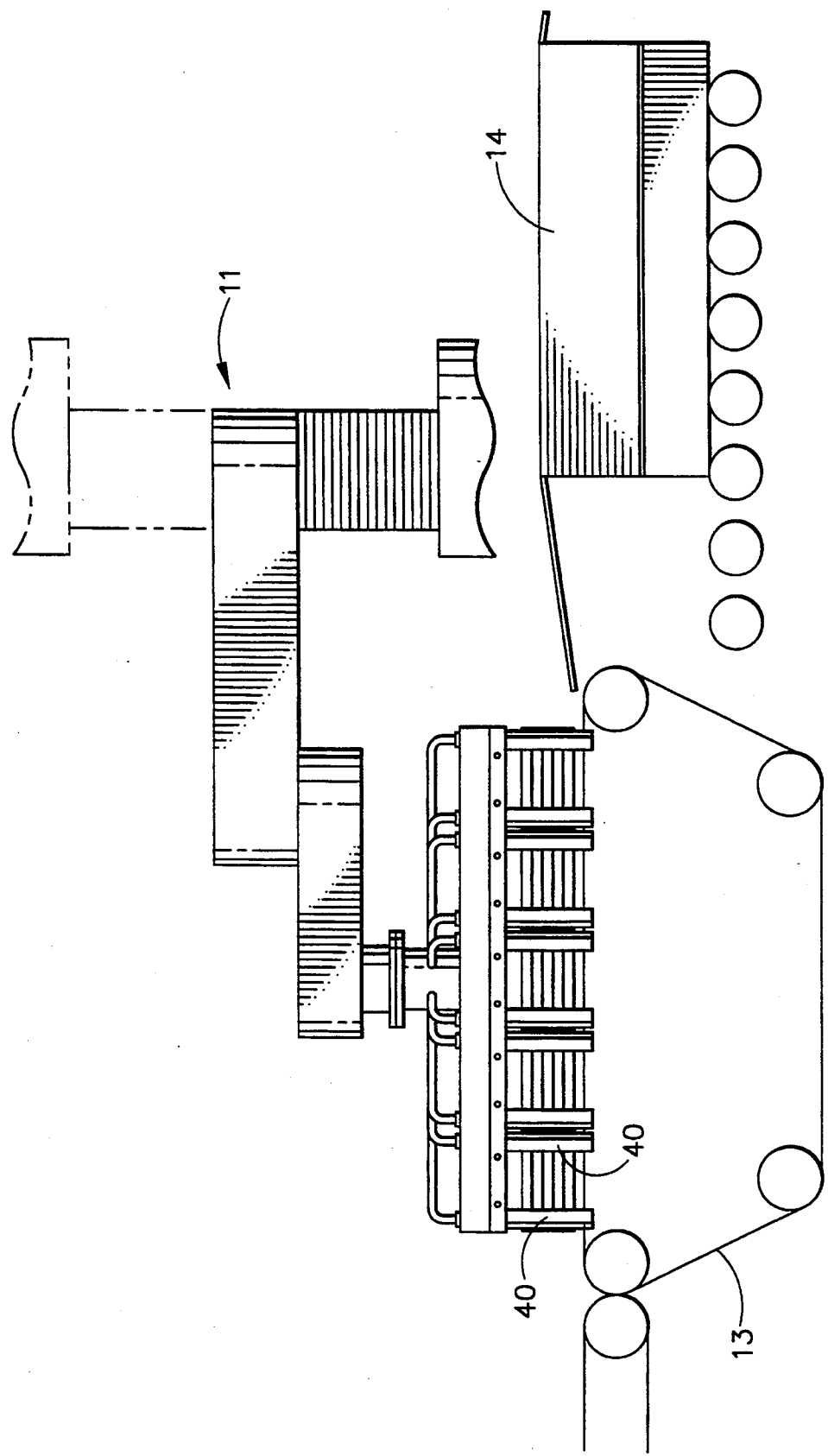
FIG. 7 is an environmental view showing a robot with multiple robotic hands of the invention in the process of picking food patties from a product elevator.
Figure 8:
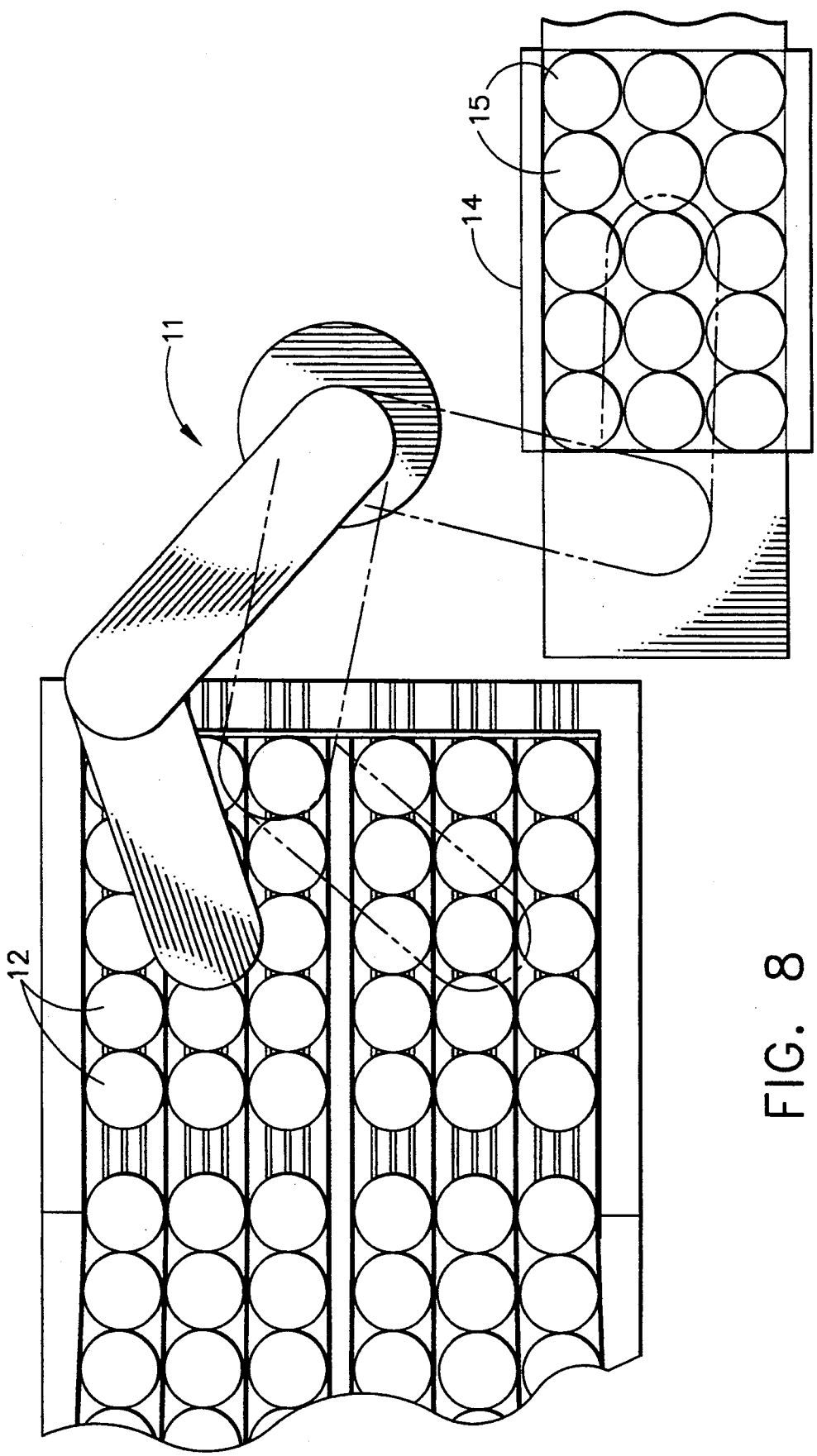
FIG. 8 is a top view of a robot with the robotic hand of the invention showing three positions of the hand in the process of loading food patties into a carton.

The robotic hand described with reference to FIGS. 1, 7 and 8 is especially configured to pick-up and transfer generally round flattened burger patties. The robotic hand of the invention is also capable of picking up and transferring other shaped and sized articles in virtually any number by routine modifications. For example, the length of the gripper finger assemblies can be changed to accommodate a very large stack of articles ranging in number from a single article upwards depending also in part on the article's thickness. The number of gripper finger assemblies and their arrangement on the manifold can also be changed. At least two gripper finger assemblies are always needed, though three or more gripper finger assemblies arranged in a configuration designed to accommodate a certain article shape and/or container shape are feasible.

FIG. 7 illustrates another variation in that there is shown a robot having several robotic hands 40 of the invention mounted thereon. The robotic hands 40 are similar in operation to the robotic hand 10 discussed above with reference to FIGS. 1-6. The finger mount flanges of the robotic hands are adaptable to mounting to a single manifold. The manifold is structured to distribute the controlled pressure air to several sets of gripper finger assemblies on the robotic hands to very efficiently pick several articles off the product elevator and form stacks of the articles within the individual gripper finger assemblies.

FIG. 8 illustrates three positions of the arm of the robot 11 while in the process of loading the burger patties 12 into the carton 14 in the form of neat stacks 15. As evident from the arm shown in solid line and two positions in phantom line, burger patties from all positions on the product elevator are reached in a sequence of movements determined by how the robot is programmed. Ultimately, all the patties on the product elevator are transferred into the carton in stack form.

While the invention has been described in detail with reference to the drawings, it should be understood various modifications can be made. All modifications of an obvious nature are considered within the scope of the appended claims.

What is claimed is:

1. A robotic hand for use on a robot programmed to pick a plurality of generally flattened articles from a packaging station and deposit the articles in a stacked form into an open-top container, said robotic hand comprising:

(a) a manifold with means to attach to the robot, said manifold capable of directing the flow of controlled pressure air; and (b) a set of gripper finger assemblies extending from the manifold and capable of receiving the plurality of the generally flattened articles therewithin in sufficient number to form a stack, each said finger assembly having an elongated rigid finger support member generally rectangularly shaped with a flat face inside surface and an elongated inflatable bladder secured to the flat face inside surface of the finger support member and extending inwardly substantially the length thereof, and further wherein each said bladder is in communication with the manifold to receive the controlled pressure air, whereby when the bladders of the gripper finger assemblies are in a substantially deflated state, the finger assemblies fit over the generally flattened article and when in an inflated state grasp each said article with sufficient force to hold it within the finger assemblies until the robotic hand is positioned directly over another said article to be lifted.

2. The robotic hand of claim 1 wherein the manifold has a mounting flange for attachment to the robot.

3. The robotic hand of claim 2 wherein the manifold has finger mount flanges extending therefrom.

4. The robotic hand of claim 3 wherein the finger mount flanges on the manifold form a square and there are four gripper finger assemblies with a gripper finger assembly positioned in each corner of the square.

5. The robotic hand of claim 4 wherein each rigid finger support member has a channel extending substantially along its length and the elongated inflatable bladder extends in the channel.

6. The robotic hand of claim 5 wherein each of the elongated bladders has a neck extending therefrom and an air connection tube positioned therein.

7. The robotic hand of claim 6 wherein a retaining clamp secures a lower portion of the elongated bladder to the finger support member and a retaining clip secures the neck of the bladder to the finger support member.

8. The robotic hand of claim 4 wherein a planar area within the gripper finger assemblies has a diagonal which is approximately equal to a burger patty diameter.

9. The robotic hand of claim 8 wherein the gripper finger assemblies have a length to accommodate therewithin a stack of from four to twelve burger patties.

10. A method of transferring generally flattened articles from a packaging station to a container in a stack form to ultimately fill the container, said method comprising:
   (a) conveying the generally flattened articles in an aligned arrangement to a product elevator, said product elevator having is a series of narrow bands spaced sufficiently apart to support the articles thereon;
   (b) positioning a robotic hand over a first article on the product elevator, said robotic hand connected to a robot programmed to move laterally over each of the articles on the product elevator in a sequence to pick up each said article in a stack form therefrom, wherein the robotic hand comprises (i) a manifold with means for attaching to the robot and capable of directing controlled pressure air and (ii) a set of gripper finger assemblies extending from the manifold to receive the generally flattened articles therewithin, each said finger assembly having an elongated inflatable bladder secured to an inside surface of a finger support member and extending substantially the length thereof and further wherein each said bladder is in communication with the manifold;
   (c) lowering the robotic hand sufficiently so that at least the tips of the gripper finger assemblies encompass the first article;
   (d) inflating the bladders in each of the gripper finger assemblies sufficiently to cause them to expand to grasp the article;
   (e) lifting the robotic hand with the article grasped therewithin;
   (f) moving the robotic hand laterally to a position directly over a second generally flattened article on the product elevator and lowering said robotic hand;
   (g) deflating the bladders in the gripper finger assemblies to drop the first article on the second article to form a stack and further to encompass said stack with the gripper finger assemblies;
   (h) reinflating the bladders of the gripper finger assemblies of the robotic hand to grasp the sides of the first and second articles;
   (i) repeating the above steps of picking-up generally flattened articles in the robotic hand until a stack of a desired number of articles within the gripper finger assemblies is formed; and
   (j) depositing the articles from the robotic hand into the container in a stack form.

11. A robotic hand for use on a robot programmed to pick a plurality of generally flattened articles from a packaging station and deposit the articles in a stacked form into an open-top container, said robotic hand comprising:
   (a) a manifold with means to attach to the robot, said manifold capable of directing the flow of controlled pressure air; and
   (b) a set of gripper finger assemblies extending from the manifold to receive the generally flattened articles therewithin in sufficient number to form a stack, each said finger assembly having a rigid finger support member having a channel extending along an inside surface of the finger support member substantially along full length of the finger support member and an elongated inflatable bladder secured in the channel of the finger support member and extending substantially the length of the channel, and further wherein each said bladder is in communication with the manifold to receive the controlled pressure air, whereby when the bladders of the gripper finger assemblies are in a substantially deflated state, the finger assemblies fit over the generally flattened article and when in an inflated state grasp each said article with sufficient force to hold it within the finger assemblies until the robotic hand is positioned directly over another said article to be lifted.

12. The robotic hand of claim 11 wherein the manifold has finger mount flanges extending therefrom.

13. The robotic hand of claim 12 wherein the finger mount flanges on the manifold form a square and there are four gripper finger assemblies with a gripper finger assembly positioned in each corner of the square.

14. The robotic hand of claim 13 wherein each of the elongated bladders has a neck extending therefrom and an air connection tube positioned therein.

15. The robotic hand of claim 14 wherein a retaining clamp secures a lower portion of the elongated bladder to the finger support member and a retaining clip secures the neck of the bladder to the finger support member.

16. The robotic hand of claim 15 wherein a planar area within the gripper finger assemblies has a diagonal which is approximately equal to a burger patty diameter.

17. The robotic hand of claim 16 wherein the gripper finger assemblies have a length to accommodate therewithin a stack of from four to twelve burger patties.

* * * * *